United States Patent
Chu Chen et al.

(10) Patent No.: US 7,870,548 B2
(45) Date of Patent: Jan. 11, 2011

(54) METHOD FOR UPDATING AN IMAGE FILE

(75) Inventors: Chi-Yuan Chu Chen, Taipei (TW); Tsung-Pin Wang, Taipei (TW)

(73) Assignee: Inventec Corporation, Taipei (TW)

( * ) Notice: Subject to any disclaimer, the term of this patent is extended or adjusted under 35 U.S.C. 154(b) by 1042 days.

(21) Appl. No.: 11/649,906

(22) Filed: Jan. 5, 2007

(65) Prior Publication Data
US 2008/0168244 A1    Jul. 10, 2008

(51) Int. Cl.
G06F 9/44    (2006.01)

(52) U.S. Cl. ........................................ 717/168; 717/170
(58) Field of Classification Search .................. 717/170
See application file for complete search history.

(56) References Cited

U.S. PATENT DOCUMENTS

| | | | |
|---|---|---|---|
| 6,832,373 B2* | 12/2004 | O'Neill | 717/171 |
| 7,353,355 B1* | 4/2008 | Tormasov et al. | 711/165 |
| 7,631,174 B2* | 12/2009 | Koizumi | 713/1 |
| 7,805,719 B2* | 9/2010 | O'Neill | 717/168 |
| 2005/0228888 A1* | 10/2005 | Mihm et al. | 709/227 |
| 2007/0294575 A1* | 12/2007 | Aichelen et al. | 714/13 |

* cited by examiner

*Primary Examiner*—Wei Y Zhen
*Assistant Examiner*—Phillip H Nguyen
(74) *Attorney, Agent, or Firm*—Bacon & Thomas, PLLC

(57) ABSTRACT

The present invention relates to a method for updating an image file that is performed by a server, when a workable image file pre-stored in a storage unit of said server needs to be updated by a new image file, that duplicates said workable image file to said storage unit as a backup image file, and then restarts said serve by invoking the operating system with said new image file, and if an operating system can not be successfully invoked with said new image file, said server automatically selects said backup image file to invoke the operating system and restore to the status before said update.

12 Claims, 3 Drawing Sheets

US 7,870,548 B2

METHOD FOR UPDATING AN IMAGE FILE

FIELD OF THE INVENTION

The present invention is related to a method for updating an image file and is performed by a server when a workable image file pre-stored in a storage unit of said server needs to be updated by a new image file, said server automatically selects the new image file or a backup image file to invoke the operating system and is capable of restoring to the status before said update when necessary.

BACKGROUND OF THE INVENTION

Being a high performance computing system, a server is usually utilized as a node to store or process data on a network. Comparing to regular personal computers, servers are more powerful in data processing, more stable, reliable, expandable, manageable and secure. Coupled with recent quantum leaps in telecommunication technologies and ever increasing information traffic, servers have become a commodity in corporations and institutions to provide data download, upload and e-mail services. Consequently, improving processing power and reliability so that it can offer a more stable and user-friendly information managing environment is a crucial issue to the quality of servers. Manufacturers continuously put serious effort in resolving malfunctions in servers which may cause interruption of data acquisition or network service. The ultimate goal is to develop new technologies to tackle problems and increase stability.

For example, some servers have Intelligent Platform Management Interface (IPMI) installed to monitor system health and manage the serve system. The IPMI consists of a main controller called a Baseboard Management Controller (BMC). The BMC connects to sensors of devices to be monitored (e.g. CPU for its temperature and voltage or CPU fan for its rotation speed) via a standard system interface such as I2C/IPMB (Intelligent Platform Management Bus/Bridge), Serial/Modem interface or LAN interface, and collects sensed measurements from said sensors. When serious anomaly is determined by said BMC basing on said sensed measurements of monitored devices, BMC may perform corrective actions to allow the server to provide non-stop service, or it may halt the service to prevent more serious mistakes from occurring.

Said BMC comprises firmware for determining whether serious anomaly has happened to a device in said server. Said firmware resides in a storage unit (e.g. flash memory) in the format of an image file. An update of said firmware of said BMC is usually carried out by a boot loader program in a boot sector of said storage unit. Said boot loader runs under a Disk Operating System (DOS) which provides only a simple user interface for said firmware update, therefore a user encounters considerable amount of inconvenience when performing an update of an image file of firmware.

Furthermore, to effectively manage the chassis (or enclosure) and the switch of a server so that said server can provide reliable services and resources, a Roadrunner & Chassis Management System (RCMS) might be installed. An RCMS uses file system and is stored as multiple image files in a storage unit (e.g. hard disk drive). If a user were to update an RCMS via a file system, not only will it be extremely complicated, once the RCMS update fails, there will not be a means to restore back the previous image file.

From the above-mentioned, image file updates are necessary in achieving the goal of providing a more powerful, more stable, more reliable, more expandable, more manageable and more secure serve system. However, said update procedure is highly inconvenience and in the case of an unsuccessful update, the original workable image file is not automatically recovered. Thus, a method for updating an image file which resolve said drawbacks will greatly benefit both the manufacturers and users.

SUMMARY OF THE INVENTION

After considerable research and experimentation, a method for updating an image file according to the present invention has been developed so as to overcome the drawbacks associated with said prior art.

It is an object of the present invention to provide an image file updating method that is performed by a server when a workable image file pre-stored in a storage unit of said server needs to be updated by a new image file, and that duplicates said workable image file to the storage unit as a backup image file, and then restarts said serve by invoking the operating system with said new image file, and if an operating system can not be successfully invoked with said new image file, said server automatically selects said backup image file to invoke the operating system and restore to the status before said update, thereby solved the drawbacks of prior methods such as inconvenience in operation and inability to automatically recover from an errant update.

The above and other objects, features and advantages of the present invention will become apparent from the following detailed description taken with the accompanying drawings.

BRIEF DESCRIPTION OF THE DRAWINGS

The features, objects and advantages of the invention will become more apparent from the detailed description set forth below when taken in conjunction with the drawings in which like references characters identify correspondingly throughout, and wherein.

DETAILED DESCRIPTION OF THE PREFERRED EMBODIMENTS

Figure 1:
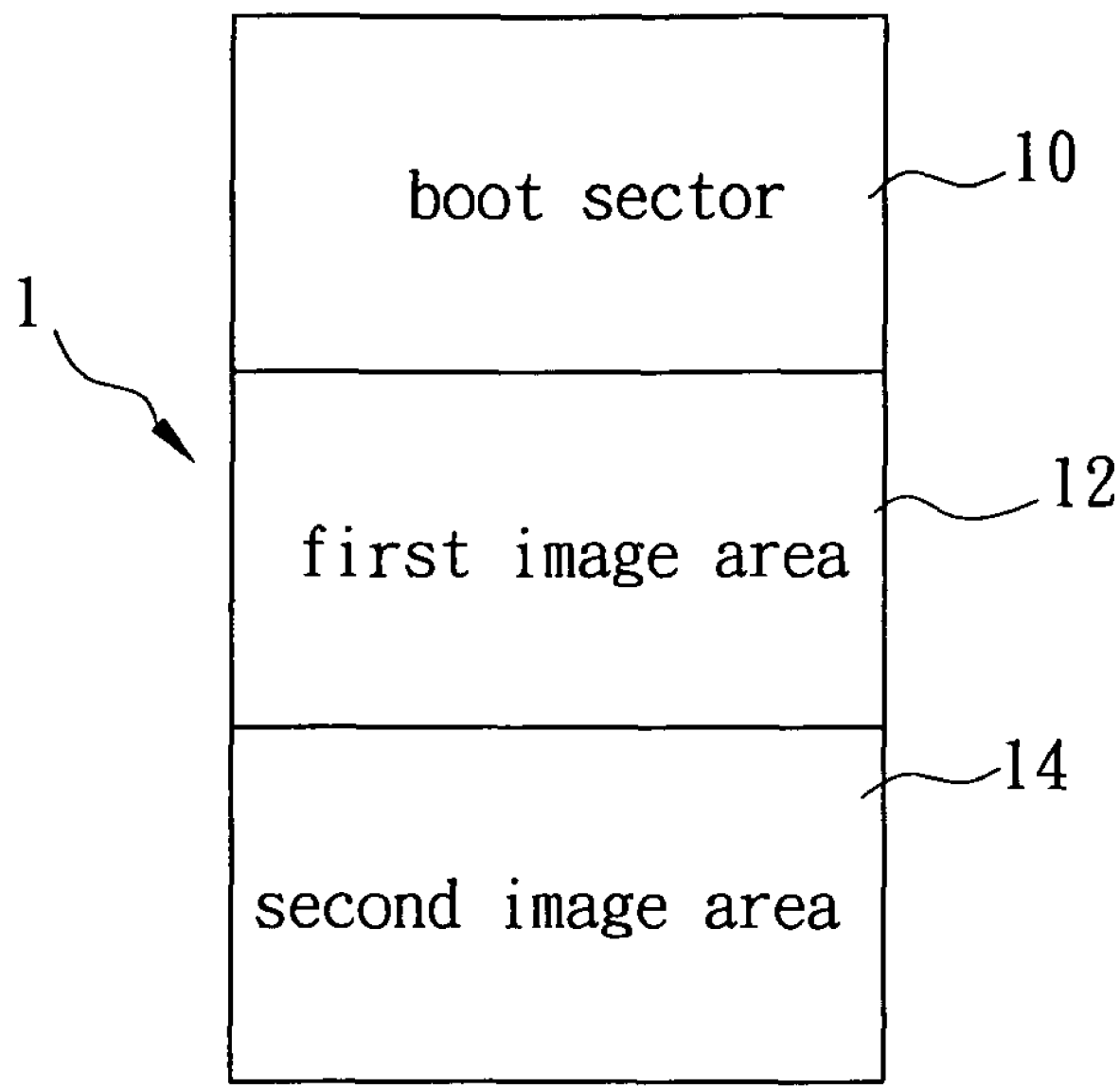
FIG. 1 shows a perspective diagram of a storage unit in accordance with the present invention.
Figure 2:
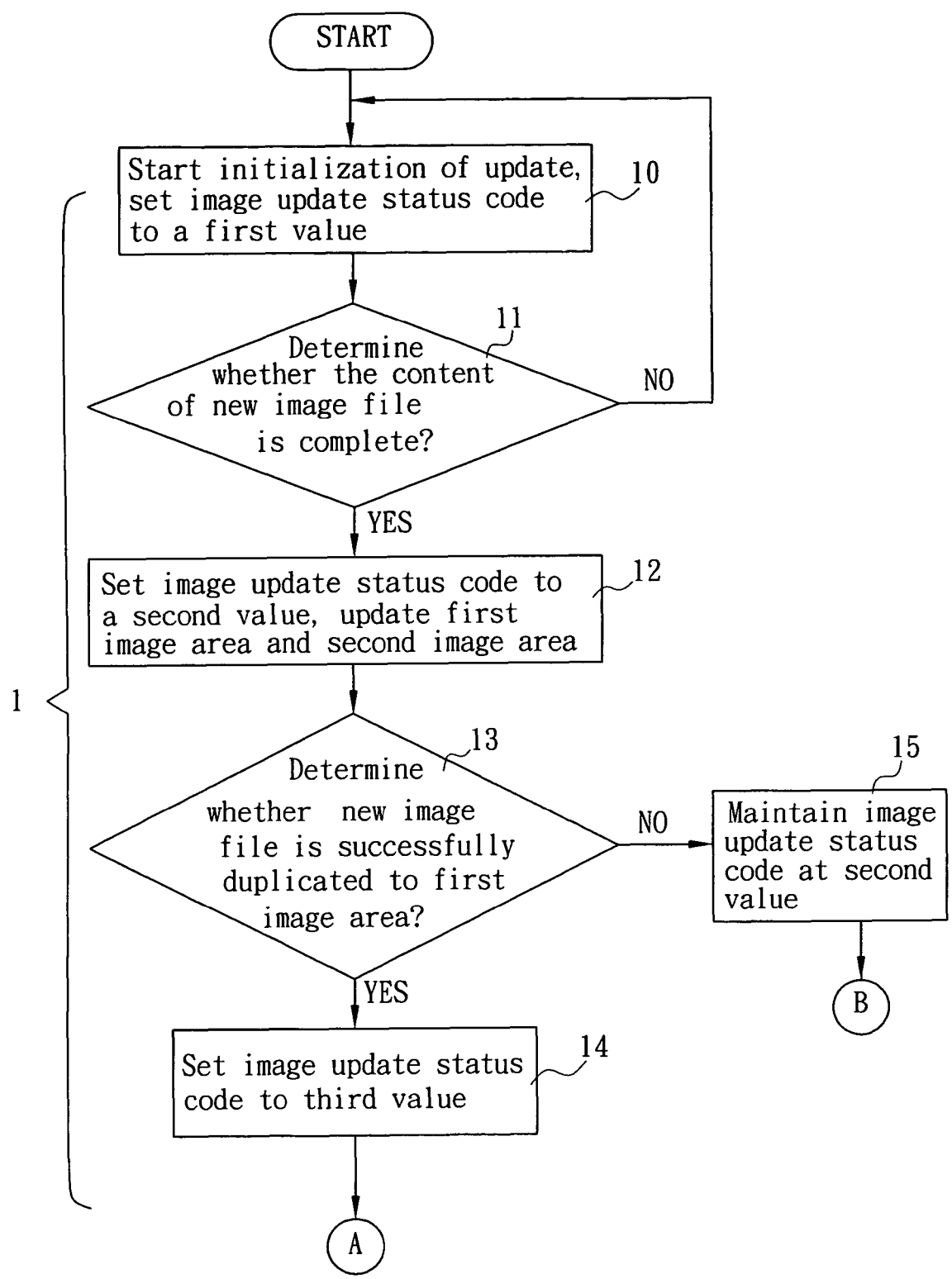
FIG. 2 shows a flow chart illustrating the procedure of a server updating a workable image file and backing up an image file in a preferred embodiment in accordance with the present invention.

The present invention relates to a method for updating an image file and is performed by a server. Refer to FIG. 1. A server preferably having at least a storage unit 1 (e.g. a flash memory) partitions said storage unit 1 into a boot sector 10, a first image area 12 and a second image area 14, where said boot sector 10 pre-stores a boot loader and an image update status code, said first image area 12 pre-stores a workable image file and said second image area is for storing a backup image file. Said backup image file is generated by duplicating said verified workable image file in said first image area 12. Refer to FIG. 2. When said workable image file pre-stored in said storage unit of said server is being updated by a new image file, said serve performs the following steps.

(1) Duplicate said workable image file in said first image area 12 to said second image area 14 as a backup image file, and duplicate the new image file to said first image area 12 as a current working image file. To guarantee the correctness of the updated new image file and detect the completion of said new image file update, the procedure of updating said workable image file and backing up said workable image file preferably comprises the following steps.

(10) Start initialization of update and set said image update status code to a first value with said first value indicating the current start is not the first time after said workable image file in said first image area 12 has been updated. In a preferred embodiment of the present invention, said image update status code is an 8-bit binary number in which the first bit (most significant bit) indicates whether the current start of said server is the very first time after said workable image file in said first image area 12 has been updated. If the binary value of said first bit is "0", it means the current start is the first time; if the first bit is "1", it means it's not the first time. The second bit indicates whether said workable image file in said first image area 12 has been successfully updated and said new image file is operable; if the second bit is "0", it means said workable image file has been successfully updated; if the second bit is "1", it means said update failed and said new image file is not operable. The third bit indicates whether said server should start with said new image file or start with said backup image file; if the third bit is "0", it means said server should start with said new image file; if the third bit is "1", it means said server should start with said backup image file. The fourth to the eighth bits are undefined in the preferred embodiment. Accordingly, in this preferred embodiment, at the starts of initialization of update of said server, it is not the first start and the update has not yet been accomplished, plus said server starts with said workable image file, therefore said image update status code is set to a first value of "1000 0000".

(11) Determine whether the content of said new image file is complete. If said content is complete, proceed with step (12), else proceed with step (10). In said preferred embodiment, said server may determine whether the content of said new image file is complete by examining correctness of a volume of said new image file, or by apply an equation on the content of said new image file to obtain a check sum and examine correctness of said check sum.

(12) When the content of said new image file is determined to be complete, set said image update status code to a second value, duplicate said workable image file in said first image area 12 to said second image area 14 as said backup image file, and duplicate said new image file to said first image area 12 as the current working image file. In the preferred embodiment, said second value indicates that the current start is not the first start and said server will use said backup image file for updating. Whether the following steps in the update procedure will be successful is still unknown at this stage. To simplify the steps following this step, said image update status code is set to "1010 0000".

(13) Determine whether said new image file is successfully duplicated to said first image area 12; if it is, go to step (14), otherwise go to step (15).

(14) Set said image update status code to a third value. Since said new image file has been confirmed to be successfully duplicated to said image area 12 before this step, the third value is not required to indicated the successful duplication of said new image file to said image area 12 and However, to assure in ensuing restarts said server acquire necessary information from the image update status code that said workable image file in said first image area 12 has been updated as said new image file and said new image file in said first image area 12 will be used when said server restarts, said third value must indicate that the current start is the first after said workable image file in said first image area 12 has been updated and said new image file in said first image area 12 will be used in restarts. Hence, in said preferred embodiment, said third value of said image update status code can be set to "0100 000" or "0000 0000".

(15) Maintain said image update status code at said second value and restarts said server. Since said new image file has been confirmed to be unsuccessfully duplicated to said image area 12 before this step, and in step (12) when the content of said new image file is determined to be complete, said image update status code has been set to a second value to indicate that the current start is not the first start and said server will use said backup image file for updating, therefore in this step, the binary value of said image update status code needs not be changed.

Figure 3:
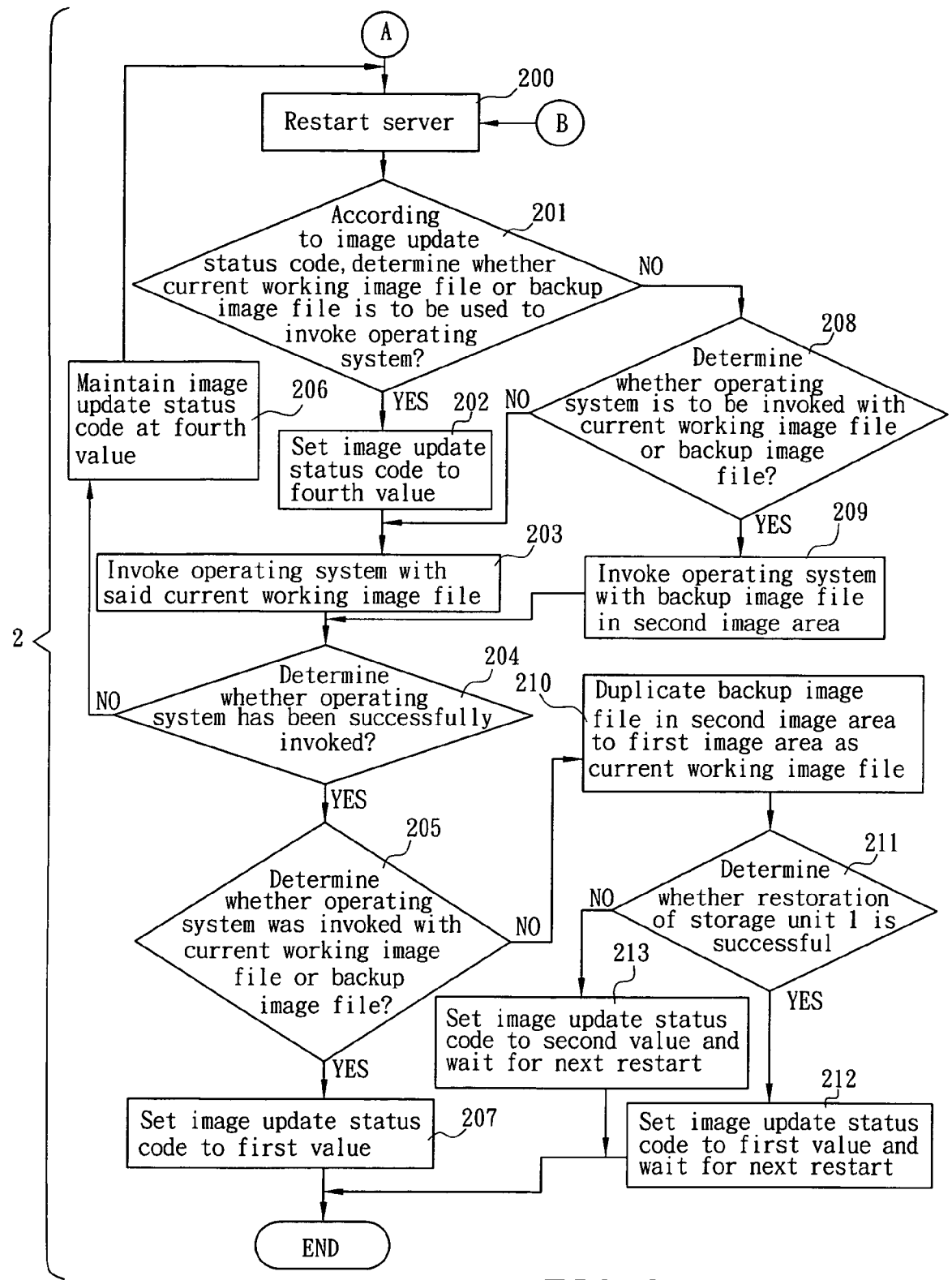
FIG. 3 shows a flow chart illustrating the procedure of restarting a server according to an image update status code.

(2) Restart said server and according to an image update status code in a boot sector established in said storage unit, determine whether to use said current working image file or said backup image file to invoke an operating system. In said preferred embodiment, after said server performed said step of updating said workable image file, said image update status code can be said first value (i.e. "1000 0000"), said second value (i.e. "1010 0000"), said third value (i.e. "0100 0000" or "0000 0000"), or a fourth value. Said fourth value is used to indicate said server is not capable of successfully invoking the operating system by using said current working image file at the start after an update and a restart of said server is required using said backup image file. In said preferred embodiment, said fourth value is represented by the binary code "1110 0000". Refer to FIG. 3 for the steps performed by said server when it restarts according to said image update status code.

(200) Restart said server.

(201) According to said image update status code, determine whether said current working image file or said backup image file is to be used to invoke the operating system in said restart. When said image update status code is set to said third value, use said current working image file in said restart and go to step (202); otherwise if said image update status code is set to said first value, said second value or said fourth value, then go to step (208).

(202) Set said image update status code to said fourth value. The image update status code is set to said fourth value under the presumption that said server can not successfully invoke the operating system with said current working image file, therefore in later steps when said server indeed can not successfully invoke the operating system with said current working image file, the value needs not be reset.

(203) Invoke the operating system with said current working image file.

(204) Determining whether the operating system has been successfully invoked. If the operating system is determined to have been successfully invoked, go to step (205), otherwise go to step (206).

(205) Determine whether the operating system was invoked with said current working image file or said backup image file. When the operating system is determined to have been invoked with said current working image file, go to step (207), otherwise the operating system was invoked by said backup image file, go to step (210).

(206) Maintain said image update status code at said fourth value and return to step (200).

(207) Set said image update status code to said first value to indicate that said current working image file has been successfully updated and from now on all starts invoke the operating system with said current working image file. End the procedure.

(208) The procedure reaches this step when said image update status code is set to one of said first value, said second value or said fourth value during restart of said server, wherein said first value indicates said current working image file is to be used to invoke the operating system, while said second value or said fourth value indicates the operating system will be invoked with said backup image file. Consequently, in this step, it is required to determine whether the operating system is to be invoked with said current working image file or said backup image file. When the operating system is determined to be invoked with said backup image file, go to step (209); otherwise go to step (203) and use said current working image file to invoke the operating system.

(209) Invoke the operating system with said backup image file, then go to step (204).

(210) Restore said first image area 12 and said second image area 14 to the status before said update by duplicating said backup image file in said second image area 14 to said first image area 12 as the current working image file, then go to step (211).

(211) Determine whether said restoration of said first and second image areas in said storage unit 1 is successful; when said restoration of said storage unit is determined to be successful, go to step (212), otherwise go to step (213).

(212) Set said image update status code to said first value and wait for a next restart.

(213) Set said image update status code to said second value and wait for a next restart.

From the descriptions provided above, storage unit 1 of said server comprises two independent image areas with one storing a workable image file and the other a backup image file. After an update of the workable image file has been completed in said storage unit 1 as a current working image file, said server automatically selects said current working image file or said backup image file to invoke an operating system in the next start. Furthermore, said server is able to select said backup image file for invoking the operating system when necessary as well as restore the status of said storage unit 1 before said update, thereby solved the problems exist in conventional methods such as inconvenience in operation and inability to automatically recover from an errant update.

While the invention herein disclosed has been described by means of specific embodiments, numerous modifications and variations could be made thereto by those skilled in the art without departing from the scope and spirit of the invention set forth in the claims.

What is claimed is:

1. A method of updating an image file, said method being performed by a server when a workable image file pre-stored in a storage unit of said server is being updated by a new image file, said method comprising the steps of:

starting initialization of update and setting an image update status code in a boot sector established in said storage unit to a first value, wherein said first value represents that a current start of said server is not a first start after said workable image file in a first image area has been updated and that said server will be started by using said workable image file to invoke an operating system;

determining whether content of said new image file is complete;

when the content of said new image file is determined to be complete, setting said image update status code to a second value, duplicating said workable image file in said first image area to a second image area of said storage unit as a backup image file, and duplicating said new image file to said first image area as a current working image file, wherein said second value represents that current start of said server is not a first start after said workable image file in said first image area has been updated and that said server will be started by using said backup image file in said second image area to invoke said operating system;

determining whether said new image file is successfully duplicated to said first image area when said new image file is determined to have been successfully duplicated to said first image area, setting said image update status code to a third value, wherein said third value represents that current start of said server is a first start after said workable image file in said first image area has been updated and that said server will be started by using said new image file in said first image area to invoke said operating system; and invoking said operating system by using said workable image file, said backup image file or said new image file according to said image update status code in said boot sector.

2. The method of claim 1, wherein when the content of said new image file is determined to be incomplete, re-executing the procedure with the step of starting initialization of update.

3. The method of claim 1, wherein when said new image file is determined to have been unsuccessfully duplicated to said first image area, maintaining said image update status code at said second value.

4. The method of claim 1, wherein said server examines correctness of a volume of said new image file in determining whether the content of said new image file is complete.

5. The method of claim 1, wherein said server applies an equation on the content of said new image file to obtain a check sum and examines correctness of said check sum in determining whether the content of said new image file is complete.

6. The method of claim 1, wherein after said server has updated said workable image file, said image update status code is set to one of said first value, said second value, said third value or a fourth value, wherein said fourth value represents that said server is not capable of successfully invoking the operating system by using said new image file after said workable image file in said first image area has been updated and said server is started, and said server is required to use said backup image file to invoke said operating system.

7. The method of claim 1, wherein when said server is operated in a restart, said server performs the steps of according to said image update status code, determining whether said new image file or said backup image file is to be used to invoke the operating system in said restart;

when said image update status code is set to said third value, using said new image file in said restart;

setting said update status code to said fourth value;

using said new image file to invoke the operating system;

determining whether the operating system has been successfully invoked;

when the operating system is determined to have been successfully invoked, determining whether the operating system was invoked with said new image file or said backup image file; and when the operating system is determined to have been invoked with said new image file, setting said image update status code to said first value.

8. The method of claim 7, wherein when the operating system is determined to have been unsuccessfully invoked, said server performs the step of said restart.

9. The method of claim 7, wherein when the operating system is determined to have been invoked with said backup image file, said server performs the steps of:

restoring said first image area and said second image area to statuses before being updated by duplicating said backup image file in said second image area to said first image area as said current working image file;

determining whether said restoring of said storage unit is successful; and when said restoring of said storage unit is determined to be successful, setting said image update status code to said first value and remaining in a state of waiting for a next restart.

10. The method of claim 9, wherein when said restoring of said storage unit is determined to be unsuccessful, setting said image update status code to said second value and remaining in a state of waiting for a next restart.

11. The method of claim 7, wherein if said image update status code is set to one of said first value, said second value or said fourth value during restart of said server, said server performs the steps of determining whether the operating system is to be invoked with said new image file or said backup image file; and when the operating system is determined to be invoked with said backup image file, invoking the operating system with said backup image file and then following said steps from determining whether the operating system has been successfully invoked.

12. The method of claim 7, wherein when the operating system is determined to be invoked with said new image file, said server follows said steps from using said new image file to invoke the operating system.

* * * * *